United States Patent
Chen

(10) Patent No.: US 11,464,222 B2
(45) Date of Patent: Oct. 11, 2022

(54) RODENT TRAP AND METHOD OF USING IT

(71) Applicant: Owltra Tech Co., Ltd., Denver, CO (US)

(72) Inventor: Hongguang Chen, Ningbo (CN)

(73) Assignee: OWLTRA TECH CO. LTD., Denver, CO (US)

( * ) Notice: Subject to any disclaimer, the term of this patent is extended or adjusted under 35 U.S.C. 154(b) by 128 days.

(21) Appl. No.: 16/801,076

(22) Filed: Feb. 25, 2020

(65) Prior Publication Data
US 2020/0187486 A1 Jun. 18, 2020

(30) Foreign Application Priority Data
Sep. 12, 2019 (CN) .......................... 201910867252.7

(51) Int. Cl.
*A01M 23/38* (2006.01)

(52) U.S. Cl.
CPC .................................. *A01M 23/38* (2013.01)

(58) Field of Classification Search
CPC .............................. A01M 23/38; A01M 23/00
See application file for complete search history.

(56) References Cited

U.S. PATENT DOCUMENTS

| | | | | |
|---|---|---|---|---|
| 3,815,278 A * | 6/1974 | Beaton | ............... | A01M 23/38 43/99 |
| 5,918,409 A * | 7/1999 | Carnwath | ............. | A01M 23/12 43/99 |
| 6,735,899 B1 * | 5/2004 | Anderson | ............. | A01M 23/04 43/98 |
| 6,865,843 B1 * | 3/2005 | Jordan, Sr. | ............ | A01M 23/12 43/139 |
| 7,219,466 B2 * | 5/2007 | Rich | ...................... | A01M 23/38 43/98 |

(Continued)

FOREIGN PATENT DOCUMENTS

| | | |
|---|---|---|
| CN | 101715294 A | 5/2010 |
| CN | 109122651 A | 1/2019 |

(Continued)

OTHER PUBLICATIONS

EPO Search Report of EP20159874 dated Aug. 25, 2020.

*Primary Examiner* — Timothy D Collins
*Assistant Examiner* — Nicholas Leo Seneczko
(74) *Attorney, Agent, or Firm* — AEON Law, PLLC; Adam L. K. Philipp; Shan Liao

(57) ABSTRACT

A rodent trap comprising: a cage having an entrance configured to allow a rodent to enter the cage; a control circuit board; discharge plates on an inner surface of the cage and spaced apart from each other, wherein the control circuit board is configured to establish a voltage between the discharge plates; a first infrared sensor comprising a first infrared emitter and a first infrared receiver, wherein the rodent prevents an infrared light beam emitted by the first infrared emitter from reaching the first infrared receiver when the rodent steps on adjacent pair of the discharge plates; and a second infrared sensor comprising a second infrared emitter and a second infrared receiver placed apart from the first infrared sensor. The invention also relates a method of using a rodent trap having a first discharge plate and a second discharge plate.

20 Claims, 4 Drawing Sheets

(56) References Cited

U.S. PATENT DOCUMENTS

| | | | | | |
|---|---|---|---|---|---|
| 7,509,770 | B2* | 3/2009 | Gardner, Jr | ............ | A01M 1/026 43/107 |
| 7,530,195 | B2* | 5/2009 | Muller | ................ | A01M 23/12 43/58 |
| 7,690,147 | B2* | 4/2010 | Wetzel | ................ | A01M 23/38 43/98 |
| 7,757,430 | B2* | 7/2010 | Wetzel | ................ | A01M 23/38 43/98 |
| 8,024,888 | B2* | 9/2011 | Wetzel | ............... | A01M 31/002 43/98 |
| 8,099,900 | B2* | 1/2012 | Rivera | ............... | A01M 31/002 43/98 |
| 8,418,397 | B2* | 4/2013 | Cruz | ................... | A01M 23/14 43/99 |
| D711,495 | S * | 8/2014 | Metlen | ........................ | D22/119 |
| 8,839,550 | B2* | 9/2014 | Gardner | ............... | A01M 23/16 43/61 |
| 10,070,642 | B2* | 9/2018 | Lubic | ................... | A01M 23/08 |
| 10,143,193 | B2* | 12/2018 | Noe | ..................... | A01M 23/38 |
| 2003/0131522 | A1* | 7/2003 | Swift | ................... | A01M 23/38 43/98 |
| 2006/0123693 | A1* | 6/2006 | Muller | ................... | A01M 23/38 43/99 |
| 2009/0172995 | A1* | 7/2009 | Wetzel | ................ | A01M 31/002 43/98 |
| 2009/0313880 | A1* | 12/2009 | Bucher | ................... | A01M 23/14 43/99 |
| 2010/0146839 | A1* | 6/2010 | Cruz | .................... | A01M 23/14 43/99 |
| 2012/0174469 | A1* | 7/2012 | Gardner | ................ | A01M 23/00 43/60 |
| 2012/0285075 | A1* | 11/2012 | Lubic | ................... | A01M 23/08 43/60 |
| 2015/0150236 | A1* | 6/2015 | Grant | ................... | A01M 23/10 43/99 |
| 2017/0035040 | A1* | 2/2017 | Hobbs | ................... | H04N 5/2257 |
| 2018/0139949 | A1* | 5/2018 | Liu | ...................... | A01M 23/16 |
| 2018/0334290 | A1* | 11/2018 | Ardron | ................ | A01M 23/00 |
| 2019/0029246 | A1* | 1/2019 | Kletzli | ................... | A01M 23/38 |
| 2019/0172995 | A1 | 6/2019 | Jung et al. | | |

FOREIGN PATENT DOCUMENTS

| | | |
|---|---|---|
| EP | 2408295 A2 | 1/2012 |
| WO | 2009097898 A1 | 8/2009 |

* cited by examiner

RODENT TRAP AND METHOD OF USING IT

TECHNICAL FIELD OF THE INVENTION

The present invention relates to a rodent trap for trapping rodents and a method of using the rodent trap.

BACKGROUND

Rodents, such as rats, mice, are considered pests that damage crops and spread diseases. Wire snap trap requires no chemical or poisons, but children and adult can accidently get hurt by them. Another method for trapping rodents requires giving high-voltage electric shocks to the rodent but injuries happen if the trap is triggered by mistake. Besides, rodents may easily escape from the traps. Powered by batteries may not be feasible for some kind of rodent traps that require staying in the standby mode for a long time before catching any rodents.

SUMMARY

Disclosed herein is a rodent trap comprising: a cage having an entrance configured to allow a rodent to enter the cage; a control circuit board; discharge plates on an inner surface of the cage and spaced apart from each other, wherein the control circuit board is configured to establish a voltage between the discharge plates; a first infrared sensor comprising a first infrared emitter and a first infrared receiver, wherein the rodent prevents an infrared light beam emitted by the first infrared emitter from reaching the first infrared receiver when the rodent steps on adjacent pair of the discharge plates; and a second infrared sensor comprising a second infrared emitter and a second infrared receiver placed apart from the first infrared sensor.

According to an embodiment, the second infrared sensor is closer than the first infrared sensor to the entrance.

According to an embodiment, the rodent trap further comprises a bait region opposite the entrance, wherein the bait region comprises a baffle covering a placement port, wherein the baffle is hinged to a wall of the cage.

According to an embodiment, the baffle has at least one opening.

According to an embodiment, the rodent trap further comprises a bait region opposite the entrance, and the discharge plates comprises a first discharge plate, a second discharge closer than the first discharge plate to the entrance, and a third discharge plate placed between the first discharge plate and the second discharge plate.

According to an embodiment, the first discharge plate and the second discharge plate are short-circuited to each other.

According to an embodiment, the control circuit board is placed inside a chamber formed by a mounting substrate and a cover that is covered on the mounting substrate.

According to an embodiment, the rodent trap further comprising: a mounting substrate, wherein the mounting substrate comprises mounting legs that are extended downward from the mounting substrate, and a bait region opposite of the entrance, wherein the first infrared emitter and the first infrared receiver are located on the mounting legs that are adjacent to the bait region.

According to an embodiment, the second infrared emitter and the second infrared receiver are located on the mounting legs that are adjacent to the entrance.

According to an embodiment, the control circuit board activates the first infrared sensor and the second infrared sensor when electric resistance between first discharge plate and the second discharge plate is below a threshold.

According to an embodiment, the control circuit board supplies voltage greater than 5000 V to the discharge plates when transmission of the infrared light beam from the first infrared emitter to the first infrared receiver is blocked and an infrared light beam emitted from the second infrared emitter is received by the second infrared receiver simultaneously.

Disclosed herein is a method of using a rodent trap having a first discharge plate and a second discharge plate, comprising: monitoring electric resistance between the first discharge plate and the second discharge plate; activating a first infrared sensor and a second infrared sensor to operate when the electric resistance is below a reference threshold, wherein the first infrared sensor comprises a first infrared emitter and a first infrared receiver, and the second infrared sensor comprises a second infrared emitter and a second infrared receiver; and supplying a voltage greater than 5000 V between the first discharge plate and the second discharge plate when transmission of an infrared light beam from the first infrared emitter to the first infrared receiver is blocked and an infrared light beam emitted from the second infrared emitter is received by the second infrared receiver simultaneously.

According to an embodiment, the method of using the rodent trap that comprises an indicator light further comprising: activating the indicator light after supplying the voltage for a predetermined time period; and terminating operation of the first infrared sensor and the second infrared sensor when the indicator light is activated.

According to an embodiment, the rodent trap comprises an entrance configured to allow a rodent to enter, and a bait region opposite to the entrance, wherein the first discharge plate comprises two conductive plates short-circuited to each other, wherein one of the conductive plates is closer to the entrance than the other, and the second discharge plate is between the two short-circuited conductive plates.

According to an embodiment, the rodent trap comprises a control circuit board configured to establish a voltage between the discharge plates, wherein the control circuit board is inside a chamber formed by a mounting substrate and a cover on the mounting substrate.

DETAILED DESCRIPTION

The present invention will be further described in detail by embodiments with reference to the accompanying drawings.

Figure 1:
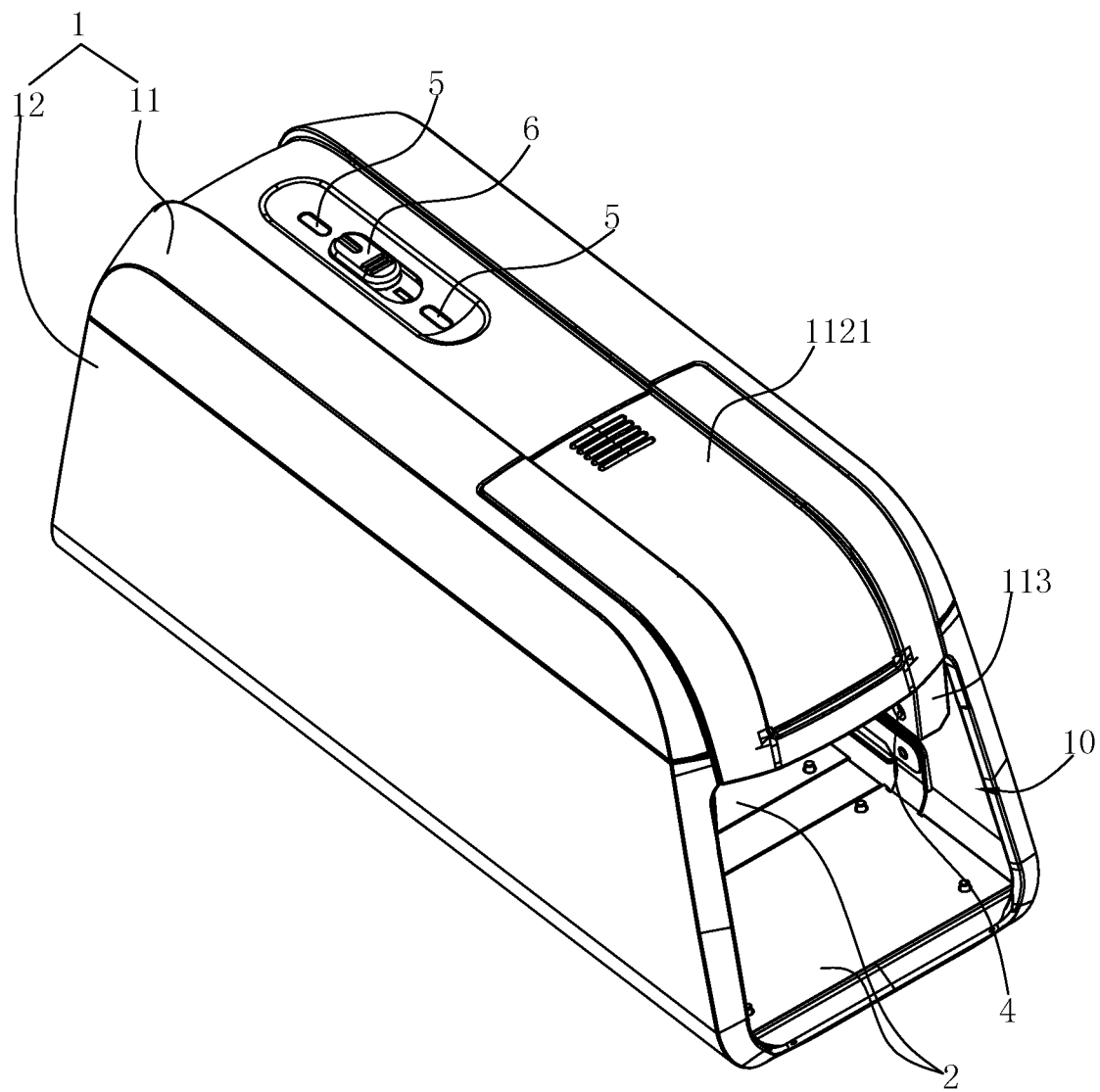
FIG. 1 is a perspective view of a rodent trap, according to an embodiment of the present invention.

FIG. 1 is a perspective view of a rodent trap, according to an embodiment of the present invention. A rodent trap comprises a cage 1 having an entrance 10 configured to allow a rodent such a rat or a mouse to enter the cage 1. The cage may further comprise an upper shell 11 and a lower shell 12. The rodent trap further comprises discharge plates 2 on an inner surface of the cage and spaced apart from each other. The rodent trap further comprises a first infrared sensor 3 (see discussion below, not shown in FIG. 1) and a second infrared sensor 4.

Figure 4:
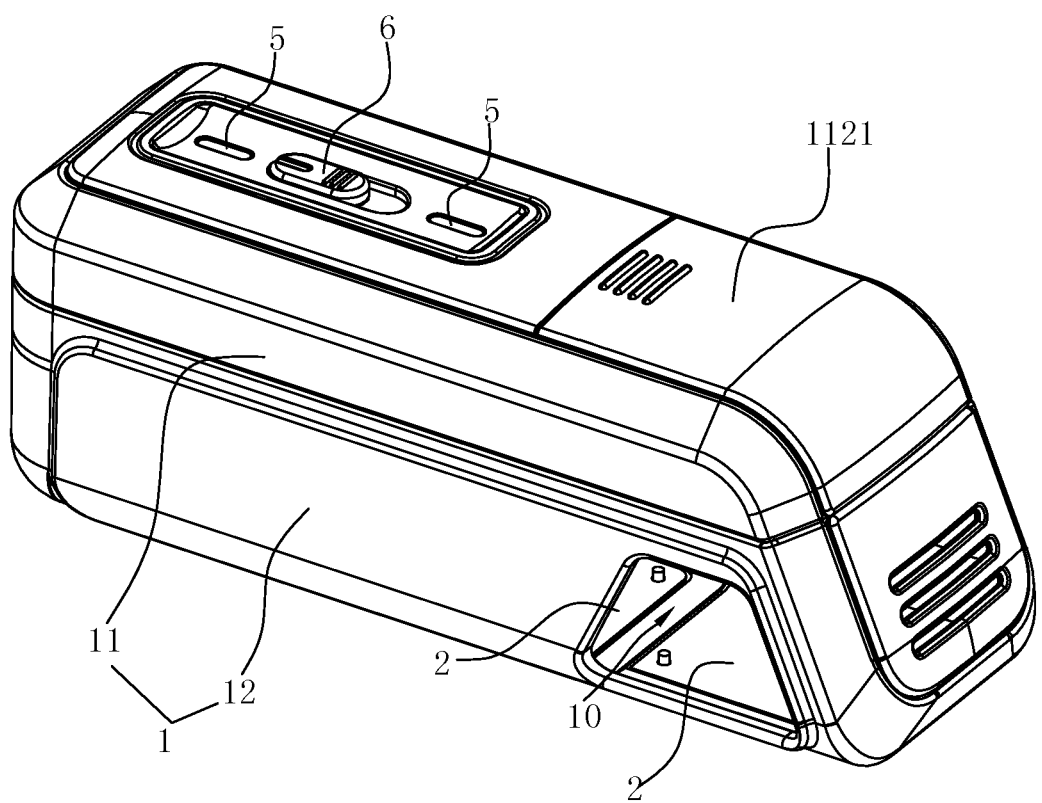
FIG. 4 is a perspective view of another rodent trap, according to another embodiment of the present invention.

The upper shell 11 may include an indicator light 5, a power switch 6 and a battery holder 1121. The upper shell 11 may include mounting legs 113 that are extended towards discharge plates 2 on the lower shell 12. The mounting legs 113 may be located on the sides of the cage 1 in pairs. As discussed below, the first infrared sensor 3 and the second infrared sensor 4 may be located on the mounting legs 113. The entrance 10 may be located at the front end of the cage 1, or on a sidewall near the rear end of the cage 1, as shown in FIG. 4.

Figure 2:
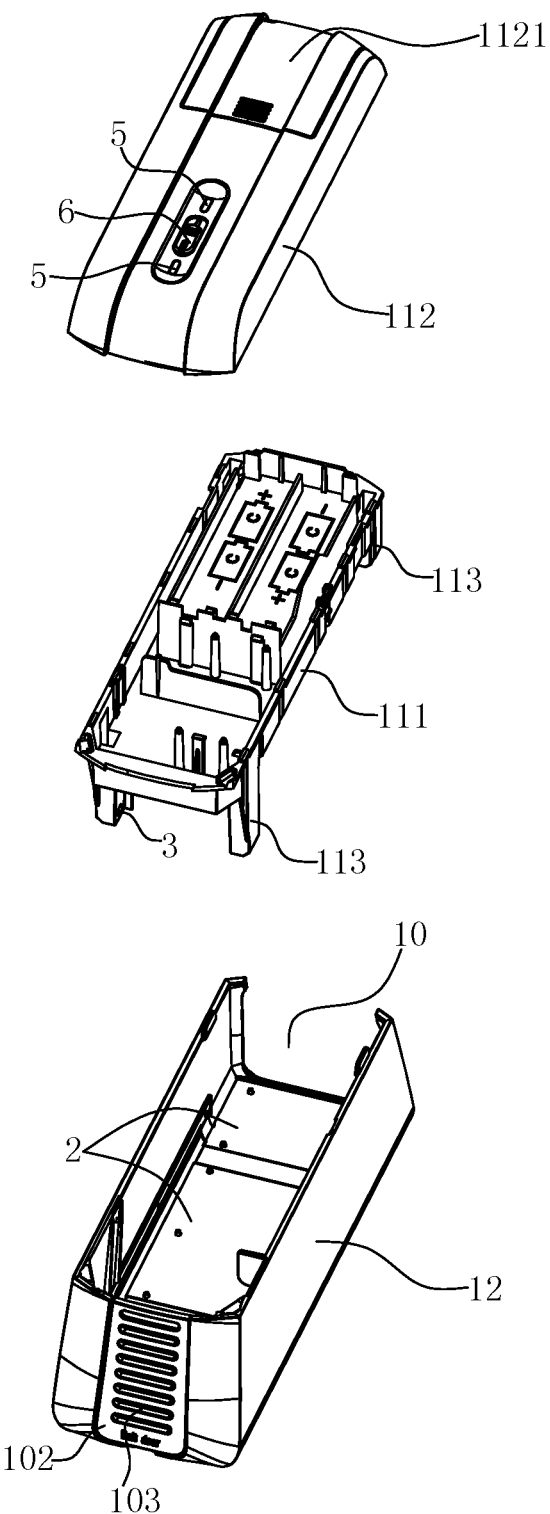
FIG. 2 is an exploded perspective view of the rodent trap, according to an embodiment of the present invention.

FIG. 2 is an exploded perspective view of the rodent trap, according to an embodiment of the present invention. According to an embodiment, the rodent trap comprises a control circuit board that may be placed inside a chamber formed by a mounting substrate 111 and a cover 112 that is covered on the mounting substrate 111. The control circuit board may include a controller and a peripheral circuit electrically connected to the controller. The control circuit board may be provided with a plug capable of being electrically connected to an external power supply, or to a battery that may be mounted in the chamber to supply power to the control circuit board. The battery holder 1121 may be located in the chamber. The battery holder 1121 is electrically connected to the control circuit board, and one or more batteries can be connected to the control circuit board after the batteries are mounted in the battery holder 1121. As an example, four batteries may be used for supplying power. Meanwhile, the battery holder 1121 may have a battery cover that can be detached. The indicator light 5 may be embedded on the shell cover 112, and the indicator light 5 may be electrically connected to the control circuit board, so that the operating state of the rodent trap is indicated in response to the control circuit board. Additionally, the power switch 6 may be electrically connected to the control circuit board to control the turn-on or turn-off of the power. The entrance 10, from which the rodent comes into the cage, may be formed in the rear end of the cage 1.

The first infrared sensor 3 includes a first infrared emitter and a first infrared receiver which may be oppositely arranged on two sides in the cage 1 and electrically connected to the control circuit board. An infrared light beam emitted by the first infrared emitter is located above one of the discharge plates 2. When a rodent steps on adjacent pair of the discharge plates 2, the infrared light beam can be prevented from reaching the first infrared receiver by the rodent.

Figure 3:
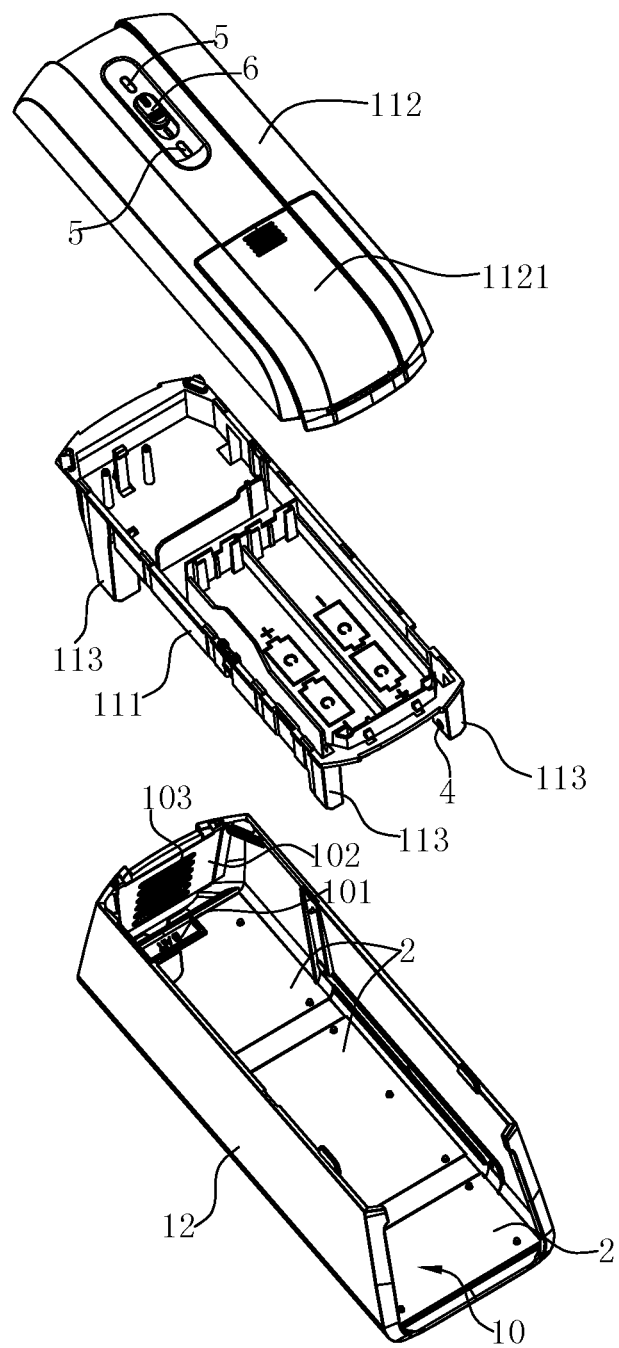
FIG. 3 is another exploded perspective view of the rodent trap, according to an embodiment of the present invention.

FIG. 3 is another exploded perspective view of the rodent trap, according to an embodiment of the present invention. The first infrared sensor 3 may be arranged in the front of the cage 1, and the second infrared sensor 4 may be further arranged in the rear of the cage 1. The second infrared sensor 4 includes a second infrared emitter and a second infrared receiver that are electrically connected to the control circuit board. The second infrared emitter and the second infrared receiver may be separately arranged on two sides of the entrance 10. The second infrared sensor may be closer than the first infrared sensor to the entrance.

The cage 1 may have a bait region 101 for placing the bait. The bait region 101 may include an opening 103 and a baffle 102 where the baffle 102 may be hinged to a wall of the cage 1. The baffle 102 may be covered on a placement port in order to prevent the rodent from escaping from the placement port. There may be one or more openings on the baffle 102 that can help spread the smell of the bait.

The discharge plates 2 may comprise a first discharge plate, a second discharge closer than the first discharge plate to the entrance, and a third discharge plate placed between the first discharge plate and the second discharge plate. The first discharge plate and the second discharge plate are short-circuited to each other, and the third discharge plate is not connected to the first discharge plate and the second discharge plate on the inner surface of the cage.

Two discharge plates 2 may be selectively disposed according to the length of the cage 1, and these discharge plates 2 disposed on a soleplate inside the cage 1 and spaced apart from each other. Each discharge plate 2 being electrically connected to the control circuit board that is configured to establish a voltage between the discharge plates 2.

In one embodiment, two discharge plates 2 are provided. One of discharge plates may be a rectangular metal plate while the other discharge plate may have two metal plate bodies connected by an elongated metal strip. That is, the two metal plate bodies are short-circuited to each other. The elongated metal strip may be part of one whole piece of metal plate, or a separate piece from the two metal plate bodies but connected with them by a conductive material. The rectangular metal plate may be plated between the two metal plate bodies. The elongated metal strip may surround the rectangular metal plate but not electrically connected to the rectangular metal plate.

As shown in FIG. 2 and FIG. 3, the first infrared emitter, the first infrared receiver, the second infrared emitter and the second infrared receiver are located respectively on the mounting legs 113 that are extended downward from the mounting substrate 111. The first infrared emitter, the first infrared receiver, the second infrared emitter and the second infrared receiver may be arranged at lower ends of the mounting legs 113. The first infrared emitter and the first infrared receiver may be oppositely arranged on a horizontal line, and the second infrared emitter and the second infrared receiver may be oppositely arranged on another horizontal line. The first infrared receiver can receive an infrared light beam signal emitted by the first infrared emitter when there is no obstacle between the first infrared emitter and the first infrared receiver. Likewise, the second infrared receiver can receive an infrared light beam signal emitted by the second infrared emitter when there is no obstacle between them.

The first infrared emitter and the first infrared receiver may be arranged on two sides in the cage 1 in such a way that the first infrared emitter and the first infrared receiver are close to the discharge plates but not in contact with the discharge plates 2. A distance between the mounting legs 113 and the discharge plates 2 is kept to prevent false alarm triggered by rodents that are not targeted by the present invention such as insects. The length of the mounting legs 113 near the entrance 10 may be the same or shorter than the mounting legs 113 near the opening 103.

The first infrared sensor 3 may be placed close to the bait region 101. In one embodiment, the first infrared sensor 3 may be located near the bait region 101 and the second infrared sensor 4 may be closer to the entrance 10 than the first infrared sensor 3. The first infrared sensor 3 and the second infrared sensor 4 may supply signals to the control circuit separately. For example, when the rodent trap is in activated and the first infrared sensor and the second infrared sensor are operating, a rodent or a person's arm comes into the cage 1 near the entrance 10. The infrared light beam emitted by the second infrared sensor may be blocked by the rodent and the person's arm. A voltage greater than 5000 V will be supplied to the discharge plates 2 only when the light beam emitted by the first infrared sensor is blocked, and simultaneously the second infrared receiver is receiving light beam signal from the second infrared sensor.

The present invention provides a method of using the rodent trap, the method comprises the following steps.

When the cage 1 is in an initial state in which no rodent comes into the cage 1, the cage 1 is in a low-power-consumption standby state. Both the first infrared sensor 3 and the second infrared sensor 4 are not operating.

Resistance signals on adjacent pair of discharge plates 2 are monitored. When a rodent or other object comes into the cage and connect adjacent pair of discharge plates 2, the electric resistance between the adjacent pair of discharge plates 2 may change. When electric resistance between the two discharge plates is below a threshold, the control circuit on the control circuit board is woken up from the low-power-consumption standby state. The threshold is of 1M ohms level that is in the range of skin resistance of a rodent. It is determined that a rodent or an object comes into the cage when the change of resistance is detected.

After the control circuit has woken up, the first infrared sensor 3 and the second infrared sensor 4 are activated to operate. That is, both the first infrared emitter and the second infrared emitter emit infrared light beams. The first infrared receiver and the second infrared receiver keep receiving the infrared light beam from the first infrared emitter and the second infrared emitter correspondingly if there is no obstacle between the infrared emitters and the infrared receivers. The control circuit board receives signals from the first infrared sensor 3 and the second infrared sensor 4 indicating the light beams are in transmission or not.

If the control circuit board acquires a signal indicating that both the infrared light beam from the first infrared sensor 3 and the light beam from the second infrared sensor 4 are blocked or only the light beam from the second infrared sensor 4 is blocked, no high-voltage power (greater than 5000V) is supplied to the discharge plates 2. The control circuit board remains receiving signals from the first infrared sensor and the second infrared sensor. For instance, in a case that a rodent bigger than a mouse, for example a rabbit or cat, comes into the cage 1 or a person's arm comes into the cage 1, the infrared light beam from the first infrared sensor 3 and the second infrared sensor 4 may be blocked. In this case, high-voltage power will not be supplied to the discharge plates 2 and accidental injury is avoided. In a case where only the infrared light beam from the second infrared sensor 4 is blocked, it may be possible that a person's finger or a small rodent's head tentatively comes into the cage 1. In this case, the rodent trap will not supply high-voltage power to the discharge plates 2 to prevent false alarm.

If the control circuit board receives a signal indicating that only the infrared light beam from the first infrared sensor 3 is blocked, and simultaneously the second infrared receiver is able to receive an infrared light beam emitted from the second infrared emitter. When the rodent has at least one foot step on one of the adjacent pair of discharge plates 2 and at least another foot step on one of the adjacent pair of discharge plates 2, the control circuit board supplies high-voltage power to the discharge plates 2. The rodent is trapped in the cage 1 because of the high-voltage power. The high-voltage power supplied to the discharge plates 2 may be in a range of 5000 V to 10000 V. The discharge time of supplying high-voltage power to the discharge plates 2 may be adjusted under different circumstances. The discharge time may be 30s to 120s depending upon the operating voltage of the discharge plates 2.

Additionally, after the mouse is trapped, the discharge plates 2, the first infrared sensor 3 and the second infrared sensor 4 are terminated to operate. That is, both of the first infrared emitter and the second infrared sensor stop emitting light beams. Meanwhile, the frequency of flashing of the indicator light 5 on the upper shell 11 may be controlled by the control circuit board. The flashing of the indicator light 5 indicates that there is a trapped rodent in the cage 1. It is convenient for the user to timely handle the trapped rodent. After the trapped rodent in the cage 1 is handled, the rodent trap needs to be manual adjusted to the low-power-consumption standby state.

FIG. 4 is a perspective view of another rodent trap, according to another embodiment of the present invention. As shown in FIG. 1, the entrance 10 may be formed on a rear end of the cage 1. Or, as shown in FIG. 4, the entrance 10 may be formed on a sidewall near the rear end of the cage 1. The purpose of setting the entrance 10 on a sidewall near the rear end of the cage 1 is to increase the probability of trapping the rodent entered into the cage 1. It is harder for the rodent to escape during the process of supplying high-voltage power to the discharge plates 2.

The invention claimed is:
1. A rodent trap comprising:
a cage having an entrance configured to allow a rodent to enter the cage;
a control circuit board;
discharge plates on an inner surface of the cage and spaced apart from each other, wherein the control circuit board is configured to establish a voltage between the discharge plates;
a first infrared sensor comprising a first infrared emitter and a first infrared receiver, wherein the rodent prevents an infrared light beam emitted by the first infrared emitter from reaching the first infrared receiver when the rodent steps on adjacent pair of the discharge plates; and
a second infrared sensor comprising a second infrared emitter and a second infrared receiver placed apart from the first infrared sensor, wherein the transmission of the infrared light beam from the first infrared emitter to the first infrared receiver is blocked and an infrared light beam emitted from the second infrared emitter is received by the second infrared receiver simultaneously whereupon the control circuit board supplies high voltage to the discharge plates.

2. The rodent trap of claim 1, wherein the second infrared sensor is closer than the first infrared sensor to the entrance.

3. The rodent trap of claim 1, further comprises a bait region opposite the entrance, wherein the bait region comprises a baffle covering a placement port, wherein the baffle is hinged to a wall of the cage.

4. The rodent trap of claim 3, wherein the baffle has at least one opening.

5. The rodent trap of claim 1, further comprises a bait region opposite the entrance, wherein the discharge plates comprise a first discharge plate, a second discharge closer than the first discharge plate to the entrance, and a third discharge plate between the first discharge plate and the second discharge plate.

6. The rodent trap of claim 5, wherein the first discharge plate and the second discharge plate are short-circuited to each other.

7. The rodent trap of claim 1, wherein the control circuit board is placed inside a chamber formed by a mounting substrate and a cover on the mounting substrate.

8. The rodent trap of claim 1, further comprising:
a mounting substrate, wherein the mounting substrate comprises mounting legs that are extended downward from the mounting substrate; and
a bait region opposite the entrance, wherein the first infrared emitter and the first infrared receiver are located on the mounting legs that are adjacent to the bait region.

9. The rodent trap of claim 8, wherein the second infrared emitter and the second infrared receiver are located on the mounting legs that are adjacent to the entrance.

10. The rodent trap of claim 1, wherein the control circuit board activates the first infrared sensor and the second infrared sensor when electric resistance between adjacent pair of discharge plates is below a threshold.

11. A method of using a rodent trap having a first discharge plate and a second discharge plate, comprising:
monitoring electric resistance between the first discharge plate and the second discharge plate;
activating a first infrared sensor and a second infrared sensor when the electric resistance is below a reference threshold, wherein the first infrared sensor comprises a first infrared emitter and a first infrared receiver, and the second infrared sensor comprises a second infrared emitter and a second infrared receiver; and
supplying a voltage greater than 5000 V between the first discharge plate and the second discharge plate when transmission of an infrared light beam from the first infrared emitter to the first infrared receiver is blocked and an infrared light beam emitted from the second infrared emitter is received by the second infrared receiver simultaneously.

12. The method of claim 11, wherein the rodent trap comprises an indicator light, further comprising:
activating the indicator light after supplying the voltage for a predetermined time period; and
terminating operation of the first infrared sensor and the second infrared sensor when the indicator light is activated.

13. The method of claim 11, wherein the rodent trap comprises an entrance configured to allow a rodent to enter, wherein the second infrared sensor is closer than the first infrared sensor to the entrance.

14. The method of claim 11, wherein the rodent trap comprises an entrance configured to allow a rodent to enter and a bait region opposite of the entrance, wherein the bait region comprises a baffle covering a placement port, wherein the baffle is hinged to a wall of the rodent trap.

15. The method of claim 14, wherein the baffle has at least one opening.

16. The method of claim 1, wherein the rodent trap comprises an entrance configured to allow a rodent to enter, and a bait region opposite the entrance, wherein the first discharge plate comprises two conductive plates short-circuited to each other, wherein one of the conductive plates is closer to the entrance than the other, and the second discharge plate is between the two short-circuited conductive plates.

17. The method of claim 11, wherein the rodent trap comprises a control circuit board configured to supply the voltage, wherein the control circuit board is inside a chamber formed by a mounting substrate and a cover on the mounting substrate.

18. The method of claim 17, wherein the rodent trap comprising:
a mounting substrate, wherein the mounting substrate comprises mounting legs that are extended downward from the mounting substrate;
an entrance configured to allow a rodent to enter; and
a bait region opposite the entrance, wherein the first infrared emitter and the first infrared receiver are located on a pair of the mounting legs adjacent to the bait region.

19. The method of claim 18, wherein the second infrared emitter and the second infrared receiver are located on a pair of the mounting legs adjacent to the entrance.

20. A rodent trap comprising:
a cage having an entrance configured to allow a rodent to enter the cage;
a control circuit board;
discharge plates on an inner surface of the cage and spaced apart from each other, wherein the control circuit board is configured to establish a voltage between the discharge plates;
a first infrared sensor comprising a first infrared emitter and a first infrared receiver, wherein the rodent prevents an infrared light beam emitted by the first infrared emitter from reaching the first infrared receiver when the rodent steps on adjacent pair of the discharge plates; and
a second infrared sensor comprising a second infrared emitter and a second infrared receiver placed apart from the first infrared sensor, wherein an electric resistance between adjacent pair of discharge plates is below a threshold whereupon the control circuit board activates the first infrared sensor and the second infrared sensor.

* * * * *